United States Patent [19]

Yoshinaka et al.

[11] Patent Number: 4,700,239
[45] Date of Patent: Oct. 13, 1987

[54] DIFFERENTIAL GAIN AND DIFFERENTIAL PHASE COMPENSATOR CIRCUIT OF A VIDEO SIGNAL

[75] Inventors: Tadaaki Yoshinaka, Hadano; Tadao Fujita, Yokohama; Teruyuki Yoshida, Ebina, all of Japan

[73] Assignee: Sony Corporation, Tokyo, Japan

[21] Appl. No.: 552,116

[22] Filed: Nov. 16, 1983

[30] Foreign Application Priority Data

Nov. 16, 1982 [JP] Japan ............................. 57-200653

[51] Int. Cl.⁴ .......................................... H04N 9/491
[52] U.S. Cl. .................................... 358/310; 360/27; 358/318
[58] Field of Search ............... 358/310, 315, 316, 318, 358/320, 324, 27; 360/27

[56] References Cited

U.S. PATENT DOCUMENTS

| | | | |
|---|---|---|---|
| 3,702,374 | 11/1972 | Numakura | 358/318 |
| 3,949,414 | 4/1976 | Hayashi | 358/316 |
| 4,223,338 | 9/1980 | Tamaru et al. | 358/318 |
| 4,356,506 | 10/1982 | Yamamitsu | 358/318 X |
| 4,394,412 | 7/1983 | Tatami | 358/318 |
| 4,400,742 | 8/1983 | Yamamitsu et al. | 358/318 |
| 4,475,133 | 10/1984 | Kimura | 360/36.1 |
| 4,480,272 | 10/1984 | Horstmann | 360/9.1 X |
| 4,533,961 | 8/1985 | Shibata et al. | 360/19.1 X |

FOREIGN PATENT DOCUMENTS

| | | | |
|---|---|---|---|
| 2908501 | 9/1980 | Fed. Rep. of Germany | 358/318 |
| 55-123281 | 9/1980 | Japan | 358/318 |
| 1412560 | 11/1975 | United Kingdom | 358/324 |

OTHER PUBLICATIONS

Translation of DT 2908501, Sep. 11, 1980.

*Primary Examiner*—Aristotelis M. Psitos
*Attorney, Agent, or Firm*—Lewis H. Eslinger; Alvin Sinderbrand

[57] ABSTRACT

A method for recording a video signal having luminance and chrominance signals by using a plurality of rotary transducing heads on a recording tape moved longitudinally by a drive mechanism, in which the time axis of the video signal is extended as long as N times, the time axis expanded video signal is divided to N channels, and first and second pilot signals having a predetermined frequency are alternately inserted into a predetermined position of a horizontal blanking period of the divided video signal. In this case, the DC voltage level of the first and second pilot signals is selected near the white peak level and near the black level respectively.

An apparatus for recording a video signal having luminance and chrominance signals on a recording tape is also disclosed which includes a circuit for expanding the time axis of the video signal, a divider for dividing the expanded video signal into a plurality of channel video signals, a circuit for producing first and second pilot signals having a predetermined frequency and DC voltage level, the DC voltage level of the first and second pilot signals being different each other and an adding circuit for adding said first and second pilot signals alternately in the horizontal blanking period of the plurality of channel video signals respectively.

9 Claims, 10 Drawing Figures

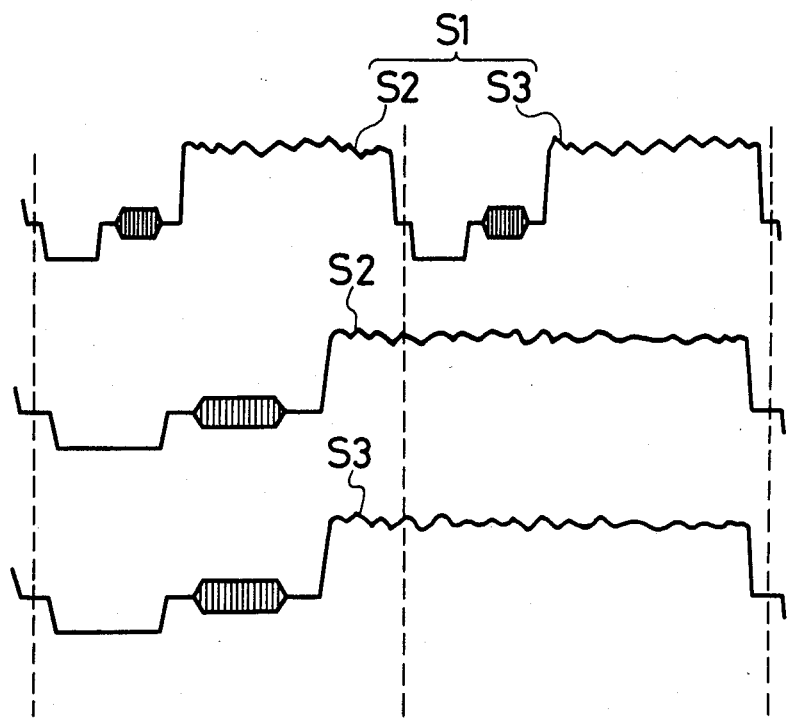
FIG. 1A PRIOR ART
FIG. 1B
FIG. 1C
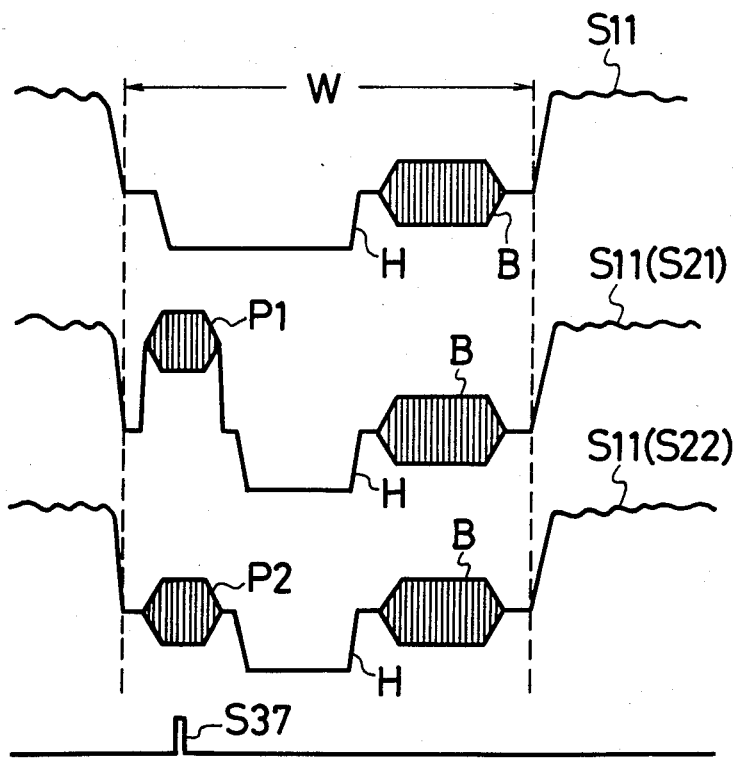
FIG. 2A
FIG. 2B
FIG. 2C
FIG. 2D

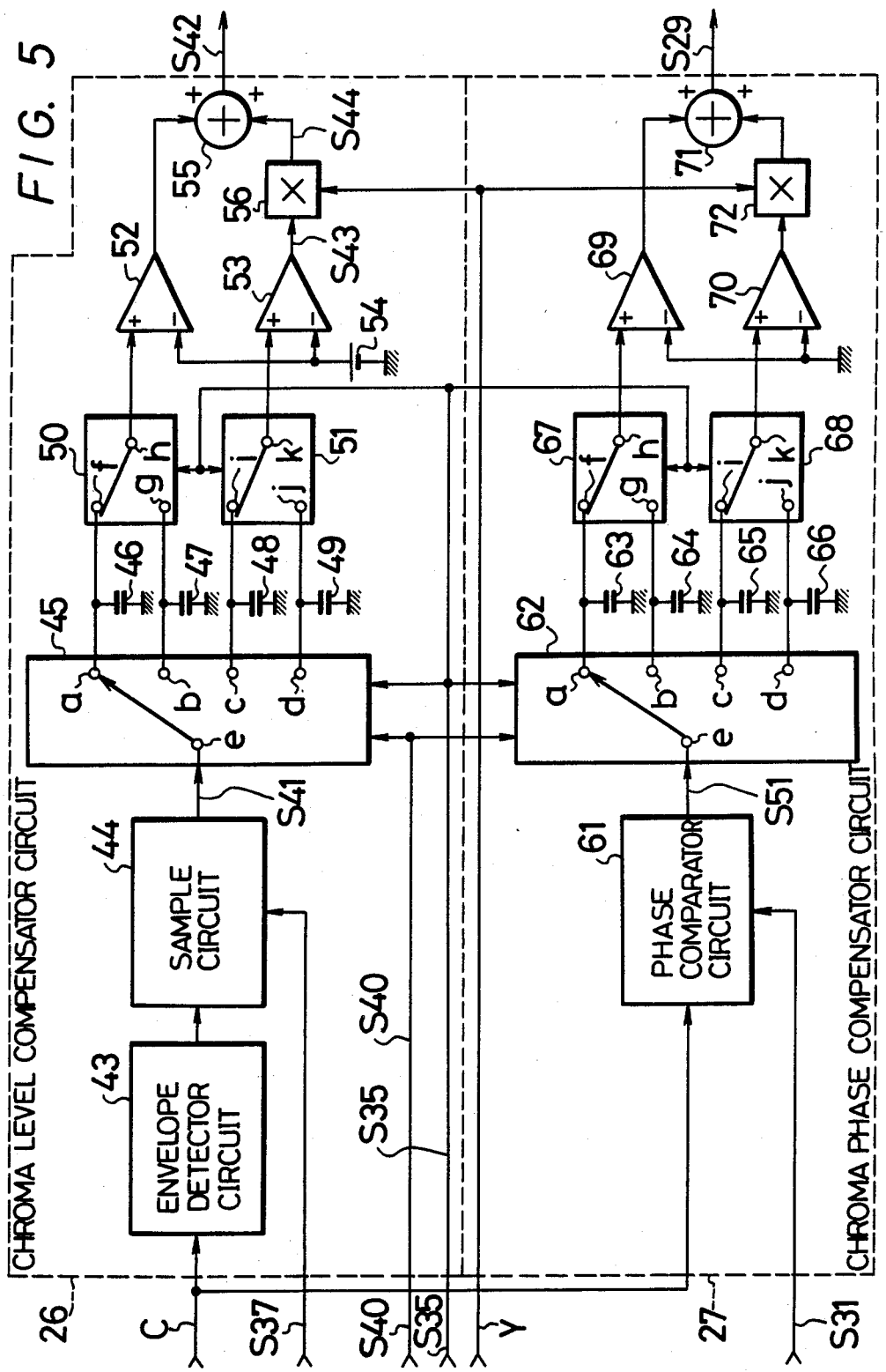

DIFFERENTIAL GAIN AND DIFFERENTIAL PHASE COMPENSATOR CIRCUIT OF A VIDEO SIGNAL

BACKGROUND OF THE INVENTION

1. Field of the Invention

This invention generally relates to a differential gain and differential phase compensator circuit for a video signal. More particularly, the present invention relates to a differential gain and differential phase compensator circuit for a video signal suitable for use with a video tape recorder of a direct recording system employing more than two video heads more than two.

2. Description of the Prior Art

As the video tape recorder (VTR) of this kind, there is proposed such a VTR of two-phase recording system which employs a plurality of video heads, for example, four video heads to record a video signal on a tape in two-phase recording way. According to the two-phase recording system, the frequency of a record signal is lowered to a half ($\frac{1}{2}$.) Therefore, in a video signal S1 (see FIG. 1A), video signals S2 and S3 appearing within successive two 1H intervals (interval in one period of a horizontal synchronizing signal) are respectively expanded twice in timebase. And, the timebase-expanded video signals S2 and S3 (see FIGS. 1B and 1C) are alternately recorded on a tape in turn by two video heads (namely, A head and B head).

When the video signal is recorded on the tape at each one scanning line by alternately driving a plurality of video heads in turn, the characteristics of signal paths through the respective video heads are different from one another so that differences appear in a signal distortion such as gain change, phase change, frequency characteristic change and the like. As a result, when the recorded signal is reproduced, the characteristic regarding a reproduced image changes at each scanning line so that the picture quality of the reproduced image is inevitably deteriorated considerably on the whole.

Particularly when there is any change in the white level regarding the whole of the video signal, the brightness on the picture screen is also changed at each scanning line. Moreover, when the level of the chroma signal in the video signal is changed, the depth of color on the picture screen is also changed at every scanning line. Furthermore, when the phase of the chroma or color signal is changed, the hue on the picture screen is also changed at each scanning line. At any rate, a so-called line crawling phenomenon occurs on the picture screen and hence a stripe pattern appears on the picture screen.

Moreover, when the timebases of the signals reproduced by the A head and the B head are not exactly coincident with each other, a so-called hue change occurs at each scanning line so that color shades are caused to change.

Therefore, in order to solve the above problems, in the art there is proposed a method in which the whole of the video signal is successively superimposed with a pilot signal and then recorded to thereby give the pilot signal with a signal distortion which is exerted on the video signal upon recording. Upon reproducing, this pilot signal is extracted, the signal distortion which is effected on the video signal is detected by detecting various distortions exerted on the pilot signal and the reproduced video signal is compensated for on the basis of the detected results so that the signal distortion exerted upon expanding and recording can be removed.

However, according to the compensation method thus proposed, since the pilot signal is superimposed upon the whole of the video signal, as the frequency of the pilot signal, it is necessary to select the frequency outside the frequency region of the video signal. As a result, the frequency region of the record signal on the tape must be secured over a wide range. As compared with a case in which upon constructing the circuitry of the VTR each circuit is designed by only considering the improvement of the characteristic of the video signal, the above previously proposed method brings about the result that the video signal is deteriorated. And, in this case, since the tape speed must be raised, the tape consumption amount must also be increased.

OBJECTS AND SUMMARY OF THE INVENTION

Accordingly, it is an object of the present invention to provide an improved differential gain and differential phase compensator circuit for a video signal.

It is another object of the present invention to provide a differential gain and differential phase compensator circuit for a video signal which can obviate the defects inherent in the conventional method in which pilot signals are successively superimposed upon the whole area of the video signal.

It is further object of the present invention to provide a differential gain and differential phase compensator circuit for a video signal which can surely compensate for a distortion which is effected on a video signal upon recording without extending the frequency region of a record signal.

It is still further object of the present invention to provide a differential gain and differential phase compensator circuit for a video signal which is suitable for use with a video tape recorder of a direct recording system having more than two video heads.

According to one aspect of the present invention, there is provided a method for recording a video signal having luminance and chrominance signals by using a plurality of rotary transducing heads on a recording tape, moved longitudinally by a drive mechanism, comprising the steps of:

expanding a time axis of said video signal as long as N times, dividing said time axis expanded video signal to N channels; and inserting first and second pilot signals having a predetermined frequency alternately in a predetermined position of a horizontal blanking period of said divided video signal, a DC voltage level of said first and second pilot signals being near white peak level and near black level respectively.

According to another aspect of the present invention, there is also provided an apparatus for recording a video signal having luminance and chrominance signals on a recording tape comprising:

means for expanding time axis of said video signal;

means for dividing said expanded video signal into a plurality of channel video signals;

means for producing first and second pilot signals having a predetermined frequency and DC. voltage level, said DC. voltage level of said first and second pilot signals being different each other; and means for adding said first and second pilot signals alternately in a horizontal blanking period of said plurality of channel video signals respectively.

According to a further aspect of the present invention, there is provided an apparatus for reproducing a video signal having luminance and chrominance signals from a recording tape by using a plurality of transducing heads, said video signal being recorded by processing a time axis expansion, division to a plurality of channel video signals and insertion of a pilot signal, said pilot signal having at least two forms of pilot signals and being inserted in a predetermined position of a horizontal blanking of said expanded and divided video signals respectively and alternately, said at least two forms of pilot signals having different DC voltage levels respectively, comprising:

means for reducing a time base error of said reproduced video signals;

means for combining said plurality of channel video signals to one channel video signal;

means for reproducing said at least two pilot signals; and means for compensating a chroma level and chroma phase of said one channel video signal in response to said reproduced at least two pilot signals.

The other objects, features and advantages of the present invention will become apparent from the following description taken in conjunction with the accompanying drawings through which the like references designate the same elements and parts.

BRIEF DESCRIPTION OF THE DRAWINGS

FIGS. 1A to 1C are respectively signal waveform diagrams used to explain a two-phase recording system;

FIGS. 2A to 2D are respectively signal waveform diagrams showing video signals in which pilot signals are inserted;

FIGS. 4 and 5 are respectively schematic circuit diagrams showing the detailed construction of the video signal compensator circuit shown in FIG. 3.

DESCRIPTION OF THE PREFERRED EMBODIMENT

An embodiment of the present invention will hereinafter be described in detail with reference to the attached drawings.

Two-phase timebase expanded video signals S2 and S3 recorded on a tape shown in FIGS. 1B and 1C are reproduced by A head and B head, respectively. Here, the video signals reproduced by the A head and the B head are referred to as a first channel reproduced signal and a second channel reproduced signal, respectively.

The first and second channel reproduced video signals are of signal systems in which pilot signals P1 and P2, each having a mean level at a white level position or black level position are inserted into a video signal S11 shown in FIG. 2A at a part of the horizontal blanking interval W thereof, for example, the time position of the front porch as shown in FIGS. 2B or 2C. And, the extended video signal S11 in which the pilot signals P1 and P2 are inserted for each channel is alternately recorded on a tape in turn.

In the case of this embodiment, the frequencies and phases of the pilot signals P1 and P2 are selected so as to be synchronized with a burst signal B placed at the back porch of a horizontal synchronizing signal H. Moreover, the relation between the time position of the horizontal synchronizing signal H and that of the burst signal B is selected to be a known value, and the burst signal B and the horizontal synchronizing signal H can be substituted with each other, whereby the construction of a reproduced signal processing system can be simplified.

Figure 3:
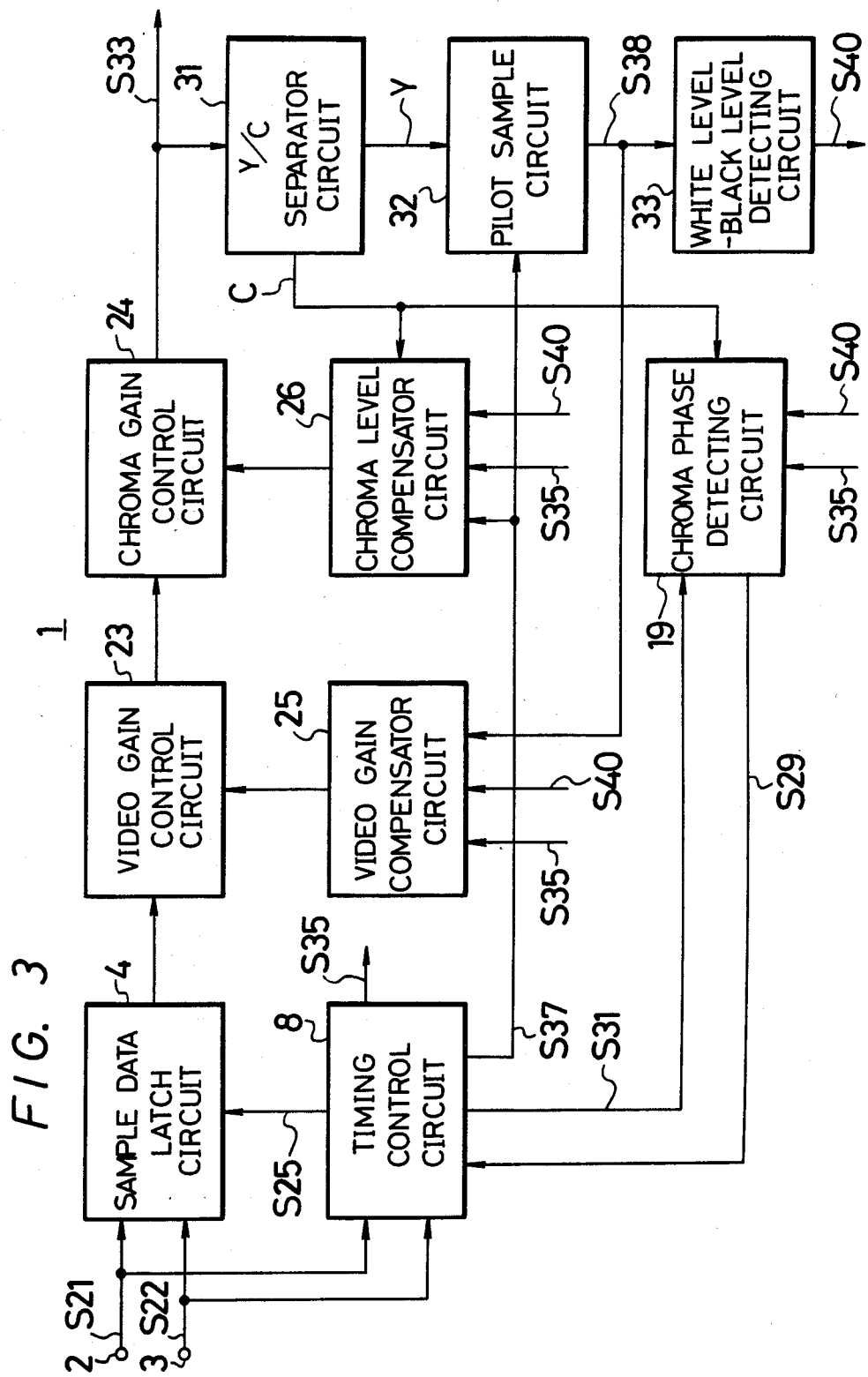
FIG. 3 is a block diagram showing an embodiment of a video signal compensator circuit according to the present invention.

First and second channel reproduced video signals S21 and S22 reproduced from the tape by the A head and the B head as described above are respectively supplied to first and second channel reproduced signal input terminals 2 and 3 of a video signal compensator circuit 1 shown in FIG. 3.

The video signal compensator circuit 1 is adapted to latch the first and second channel reproduced signals S21 and S22 converted into the form of digital data having a predetermined sampling time interval in a sample data taken-in or latch circuit 4. The sample data latch circuit 4 includes, as shown in FIG. 4, a sample data memory 5 in which the first and second channel reproduced signals S21 and S22, supplied thereto through analog-to-digital (A/D) converter circuits 6 and 7, are written in response to write signals S23 and S24 generated from a timing control circuit 8 and from which the written signals are read out in response to a read signal S25 from the control circuit 8 under the timebase being compressed.

Figure 4:
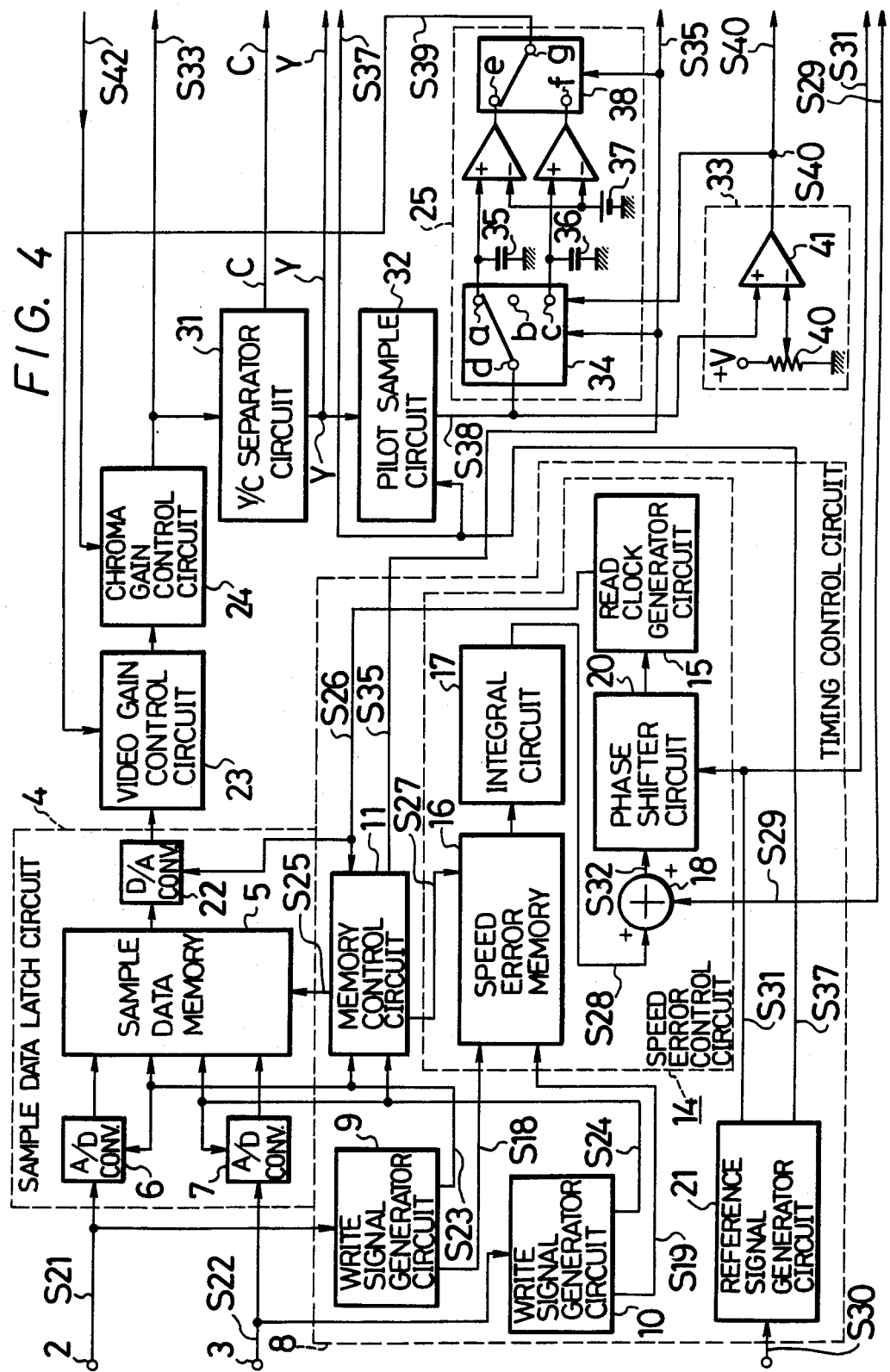

The timing control circuit 8 includes, as shown in FIG. 4, write signal generator circuits 9 and 10. The write signal generator circuits 9 and 10 are adapted to extract the burst signal B from the first and second channel reproduced signals S21 and S22 (see FIGS. 2B and 2C) and generate the write signals S23 and S24 which occur with a predetermined angle relative to the burst signal B and have the frequency 4 $f_{SCR}$ which is, for example, four times the subcarrier frequency $f_{SCR}$ ($=\frac{1}{2}f_{SC}$) of the burst signal B contained in the timebase-extended video signal S11. The write signals S23 and S24 each consist of a signal which contains the sampling timing and address useful for storing the sampled data of the first and second channel reproduced signals S21 and S22 at each sampling timing. The write signals S23 and S24 are respectively supplied to the A/D converter circuits 6 and 7 and the sample data memory 5, and further a memory control circuit 11 provided in the timing control circuit 8. Thus, in the sample data memory 5 are stored the sample data of the reproduced signals S21 and S22 in which the pilot signals P1 and P2 of white level or black level are inserted at every first and second channels in response to the burst signal and the horizontal synchronizing signal at the timing of 4 $f_{SCR}$.

The data stored in the sample data memory 5 is read out therefrom in response to the read signal S25 from the memory control circuit 11 which is driven by a read clock signal S26 generated from a read clock generator circuit 15 provided in a speed error control circuit 14 which is provided in the timing control circuit 8. The speed error control circuit 14 includes, as shown in FIG. 4, a speed error memory 16 which stores a phase difference between the write signals S18 and S19 sent from the write signal generator circuits 9 and 10 and a reference signal S27 obtained from the memory control circuit 11 in response to the read clock signal S26. The stored output from the speed error memory 16 is integrated in an integral circuit 17 to form a speed error signal S28. This speed error signal S28 is added with a chroma phase detecting signal S29, supplied from a chroma phase detecting circuit 19 (refer to FIG. 3), in an adding circuit 18, which added output S32 then is supplied to a phase shifter circuit 20. The phase shifter circuit 20 is supplied with a reference subcarrier frequency signal S31 of the frequency $f_{SC}$ generated from a reference signal generator circuit 21 based on a station reference signal S30 to thereby shift the phase thereof in response to the output signal S32 from the adding circuit 18 so that the read clock generator circuit 15 generates the read clock signal S26 which has the phase thus shifted.

In the speed error control circuit 14 constructed as mentioned above, although the phase of the write signals S18 and S19 in response to the first and second channel reproduced signals S21 and S22 stored in the speed error memory 16 is changed in accordance with the change of the tape speed upon reproducing, the phase shift amount corresponding to the integrated value of the tape speed is supplied to the phase shifter circuit 20 so that in the phase shifter circuit 20 the phase of the reference signal S31 can be controlled to follow the phase of the write signals S18 and S19. Thus, based upon the reference signal S31 having no timebase fluctuation and obtained from the reference signal generator circuit 21, the read clock signal S26 of the subcarrier frequency having a phase corresponding to the phase of the first and second channel reproduced signals S21 and S22 can be produced from the read clock generator circuit 15.

The correcting signal S29 supplied to the adding circuit 18 in the speed error control circuit 14 from the chroma phase detector circuit 19 has the level corresponding to the shift amount when the phase of a chroma signal C (refer to FIG. 3) of the first and second channel reproduced signals S21 and S22 supplied now is displaced from the reference value and, then fed to the adding circuit 18 in the mode which cancels the shift amount as will be described later. Consequently, the output terminal of the read clock generator circuit 15 delivers the stable read clock signal S26 in which the phase shift caused when the chroma signals C in the reproduced signals S21 and S22 are displaced from each other is corrected.

This read clock signal S26 is supplied to the memory control circuit 11 to sequentially specify the addresses of the sample data stored in the sample data memory 5 while to read the sample data therefrom. The read clock signal S26 is further supplied to a digital-to-analog (D/A) converter circuit 22 provided at the output terminal of sample data memory 5 so that the sample data therefrom is delivered as the video signal of the analog value through the D/A converter circuit 22, a video gain control circuit 23 and further a chroma gain control circuit 24 and then delivered as a video output signal S33 of the video signal compensator circuit 1.

Since the frequency $f_{SCR}$ of the write signals S18 and S19 (accordingly, S23 and S24) is selected to be the half the subcarrier frequency $f_{SC}$ ($f_{SCR}=\frac{1}{2}f_{SC}$), the video output signal S33, in which the timebases of the first and second channel reproduced signals S21 and S22 were extended upon recording is compressed to the half.

In the case of this embodiment, the memory control circuit 11 generates a channel mode signal S35 indicating the channel number of the data now being read out from the sample data memory 5 on the basis of the read clock signal S26 and the write signals S23 and S24.

The video gain control circuit 23 and the chroma gain control circuit 24 are controlled by a video gain correcting circuit 25 and a chroma level correcting circuit 26 (refer to FIG. 3) which are driven in response to the luminance signal Y and the chroma signal C contained in the video output signal S33.

That is, the video output signal S33 is supplied to a luminance/chroma separating circuit 31 (see FIG. 4) which then separates the luminance signal Y and the chroma signal C. The chroma signal C is supplied to the chroma level correcting circuit 26 and a chroma phase correcting circuit 27 (shown in FIG. 5), while the luminance signal Y is supplied to a pilot sample circuit 32. The pilot sample circuit 32 is supplied with a sample signal S37 generated from the reference signal generator circuit 21 in the timing control circuit 8.

As shown in FIG. 2D, the sample signal S37 is the sample pulse which is generated in the interval in which the pilot signal P1 or P2 is inserted. Consequently, a sample value signal S38 of pulse form is provided in the sample pilot circuit 32 by sampling the luminance signal Y indicative of the white level and the black level at time position in which the pilot signal P1 or P2 is inserted in response to the sample signal S37 and then is delivered to the video gain correcting circuit 25 and a white level-black level detecting circuit 33.

The video gain correcting circuit 25 is adapted to correct the level of the video output signal S33 sequentially read out from the sample data latch circuit 4 so as to be matched with the reference value by detecting the difference of the white level thereof. As shown in FIG. 4, in the video gain correcting circuit 25, the sample value signal S38 is supplied through an input side switching circuit 34 to hold circuits 35 and 36 each formed of a capacitor and held therein. The voltage thus held is compared with a reference voltage of a reference voltage source 37, and a correcting signal S39 formed of analog voltage corresponding to the difference between the voltage held and the reference voltage is supplied through an output side switching circuit 38 to the video gain control circuit 23. The input side switching circuit 34 is supplied with a white level-black level detecting signal S40 generated from the white level-black level detecting circuit 33. When the content thereof indicates the black level detection, the movable contact d of the switching circuit 34 is held in position at a neutral contact b thereof. While, the input side switching circuit 34 is supplied with the channel mode signal S35 delivered from the memory control circuit 11 in the timing control circuit 8. When the content of the signal S35 indicates the first channel or the second channel, the movable contact d of the switching circuit 34 is switchably connected to either of the first and second channel side contacts a and c. On the other hand, the output side switching circuit 38 is supplied with the channel mode signal S35. When the content thereof indicates the first or second channel, the movable contact g of the switching circuit 38 is changed in position to the first or second channel side fixed contact e or f.

Thus, in the video gain compensator circuit 25, if the pilot signal P1 of the white level is inserted when the first or second channel signal of the video output signal S33 arrives the DC level value of the luminance signal Y is held in the hold circuit 35 or 36 through the input side switching circuit 34 and the compensating signal S39 which lowers the gain of the video signal when its held voltage is higher than the output voltage from the reference voltage source 37 and which raises the gain of the video signal when the held voltage is lower than the output voltage is delivered through the output side switching circuit 38.

As shown in FIG. 4, the white level-black level detecting circuit 33 includes a comparator circuit 41 which is supplied with a reference voltage of the level corresponding to the level between the white level and the black level from a reference voltage source 40. Thus, the white level-black level detecting circuit 33 generates a white level-black level detecting signal S40 which becomes logic ⌈H⌋ when the level of the sample value signal S38 is white level and logic ⌈L⌋ when it is black level.

In the chroma level compensator circuit 26, as shown in FIG. 5, an envelope detector circuit 43 receives the chroma signal C which is derived from the luminance/chroma separator circuit 31 and supplies its envelope output to a sampling circuit 44 which is operated by the pilot sample signal S37. Thus, at the output terminal of the sampling circuit 44 appears a sample value signal S41 of pulse form which is provided by sampling the DC level value substantially corresponding to the level of the pilot signal P1 or P2. This sample value signal S41 is respectively held by way of a hold change-over switching circuit 45 in a first channel black level holding circuit 46, a second channel black level holding circuit 47, a first channel white level holding circuit 48 and a second channel white level holding circuit 49.

The hold change-over switching circuit 45 is supplied with the channel mode signal S35 and the white level-black level detecting signal S40 and then selectively supplies the sample value signal S41 of the sampling circuit 44 to the holding circuits 46 to 49 corresponding to the channel number and the white-black level which are specified by the combination corresponding to the contents of the channel mode signal S35 and the white level-black level detecting signal S40. The first and second channel black level holding circuits 46 and 47 are connected to first and second input terminals f and g of a first read specifying change-over switching circuit 50, while the first and second channel white level holding circuits 48 and 49 are connected to first and second input terminals i and j of a second read specifying change-over switching circuit 51. The switching circuits 50 and 51 are operated in gang with each other in response to the channel mode signal S35 so that when the content of the channel mode signal S35 is the first channel mode, they respectively deliver through their movable contacts h and k the voltages held in the first channel black level and white level holding circuits 46 and 48 to comparator circuits 52 and 53, while when the content of the channel mode signal S35 is the second channel mode, they supply respectively the voltages held in the second channel black level and white level holding circuits 47 and 49 to the comparator circuits 52 and 53.

The comparator circuits 52 and 53 are supplied with a reference voltage from a common reference voltage source 54 and deliver respective difference output voltages to an adding circuit 55. Thus, in the adding circuit 55, informations regarding the amplitudes of the black level and white level signals of the first channel and second channel are added together and then supplied to the chroma gain control circuit 24 as a chroma gain compensation signal S42. The chroma gain control circuit 24 is adapted to operate in such a manner that after the chroma signal in the video signal fed from the video gain control circuit 23 is separated from the luminance signal and the amplitude of the chroma signal is adjusted, this chroma signal is superimposed upon the luminance signal and then the video signal is delivered as the video output signal S33. Thus, the amplitude of the pilot signal contained in the chroma signal is controlled together with the chroma signal and compensated so as to equal the value corresponding to the reference voltage supplied from the reference voltage source 54 in the chroma level compensating circuit 26.

In addition to the construction thus made, a multiplier circuit 56 is connected to the output side of the comparator circuit 53 located at the white level side of the chroma level compensator circuit 26, which then multiplies a difference output S43 of the comparator circuit 53 with the luminance signal Y. As a result, an output signal S44 from the multiplier circuit 56 amends the value of the chroma level compensation signal S42 in response to the level of the luminance signal Y made when the level of the pilot signal P1 inserted into the white level is displaced from the reference voltage of the reference voltage source 54. By the way, in the signal processing system where a video signal is recorded on a tape and reproduced therefrom, a distortion amount of the amplitude of the video signal when the video signal is generally changed from the black level to the white level changes in the nonlinear way. As a result, the amplitude distortion of the pilot signal P1 at the white level becomes different from that of the amplitude of the pilot signal P2 at the black level (becomes large or small). Accordingly, in the case of FIG. 5, the multiplier circuit 56 is adapted to multiply the difference output S43 with the luminance signal Y in such a way that the compensation amount based on the sampled value regarding the pilot signal P1 of the white level is determined on the basis of the black level so as to cancel out the nonlinear influence.

In the chroma phase compensator circuit 27 (19 in FIG. 3), as shown in FIG. 5, the chroma signal C separated by the luminance/chroma separator circuit 31 is supplied to a phase comparator circuit 61 which then generates a phase difference signal S51 between the above chroma signal C and the reference subcarrier signal S31 from the reference signal generator circuit 21 (see FIG. 4). This phase difference signal S51 is held through a hold change-over switching circuit 62 in a first channel black level holding circuit 63, a second channel black level holding circuit 64, a first channel white level holding circuit 65 and a second channel white level holding circuit 66, respectively.

Similarly as described in the chroma level compensator circuit 26, the hold change-over switching circuit 62 is supplied with the channel mode signal S35 and the white level-black level detecting signal S40 and then allows the phase difference signal S51 from the phase comparator circuit 61 to selectively be supplied to the holding circuits 63 to 66 specified by the combination corresponding to the contents of the channel mode signal S35 and the white level-black level detecting signal S40. The first and second channel black level holding circuits 63 and 64 are respectively connected to first and second input terminals f and g of a first read specifying change-over switching circuit 67, while the first and second white level holding circuits 65 and 66 are respectively connected to first and second input terminals i and j of a second read specifying change-over switching circuit 68. The switching circuits 67 and 68 are operated in gang with each other in response to the channel mode signal S35 so that when the content of the channel mode signal S35 is the first channel mode, they allow the voltages held in the first channel black level and white level holding circuits 63 and 65 to be delivered through their movable contacts h and k to comparator circuits 69 and 70, while when the content of the channel mode signal S35 is the second channel mode, they allow the voltage held in the second channel black level and white level holding circuits 64 and 66 to be delivered to the comparator circuits 69 and 70.

The comparator circuits 69 and 70 are supplied with a common reference voltage, for example, earth potential, from which the respective difference signals are supplied to an adding circuit 71. Thus, informations regarding the phases of the black level and white level of the pilot signals P2 and P1 at the first and second channels are added together at the adding circuit 71 and then supplied therefrom to the adding circuit 18 in the speed error control circuit 14 as the chroma phase compensation signal S52 so that the phases of the pilot signals P1 and P2, namely, the phase of the chroma signal is compensated to equal the value corresponding to the ground potential which is the reference voltage.

In addition to the construction mentioned as above, also in the case of the chroma phase compensator circuit 27, a multiplier circuit 72 which receives the luminance signal Y as its one multiplying output is connected to the output side of the white level side comparator circuit 70 similarly as described in the chroma level compensator circuit 26. In consequence, in the signal processing system where the video signal is recorded on the tape and reproduced therefrom, the nonlinear distortion amount of the phase of the video signal when the video signal is changed from the black level to the white level can be compensated for by changing the difference signal at the white level side in response to the luminance signal Y.

With the construction mentioned above, when the first and second channel reproduced video signals S21 and S22 (see FIGS. 2B and 2C) reproduced from the tape arrive at the sample data latch circuit 4, the sample data are stored in the sample data memory 5 by the write signals S23 and S24 generated from the write signal generator circuits 9 and 10 (shown in FIG. 4) on the basis of the burst signal B. The data stored therein is compressed in timebase, read out in turn by the read clock signal S26 from the read clock generator circuit 15 in the speed error control circuit 14, and then delivered sequentially through the video gain control circuit 23 and the chroma gain control circuit 24 as the video output signal S33.

The speed error control circuit 14 is operated in such a manner that the phase of the read clock signal S26 is followed to those of the write signals S23 and S24 by driving the phase shifter circuit 20 to make the phase difference among the phase of the reference subcarrier signal S31 generated from the reference signal generator circuit 21 and the phases of the read clock signal S26 and the write signals S23 and S24 zero, thus preventing the timebase of the read clock signal S26 from being fluctuated.

On the other hand, in the video gain compensator circuit 25 (see FIG. 4), when the video signal of one field in which the pilot signals are inserted into the first channel and second channel white levels is read out from the sample data memory 5, the level value of the luminance signal Y at the interval in which the pilot signal is inserted is obtained from the pilot sample circuit 32 and then held in the holding circuits 35 and 36. And, by the use of the voltages held therein, the gain of the video gain control circuit 23 is compensated for to be equal to the level corresponding to the reference voltage of the reference voltage source 37. When the reference voltage common to the first and second channels is employed, the level of the video signal is compensated for so as to make the levels of the luminance signals of the first and second channels equal to each other. Thus, such a level compensation is possible that a line crawling phenomenon is not caused on the reproduced picture. By the way, when the luminance signals of the video signals of one field in the first and second channels become inconsistent with one another, the brightness of the scanning line is different at every other scanning line, and a stripe pattern appears conspicuous. However, according to the construction mentioned above, it is possible to prevent such phenomenon from occurring in advance.

At the same time, the amplitudes of the pilot signal P1 or P2 portion of one field interval in which the white level or black level pilot signal is inserted in the first or second channel are held in the holding circuits 46 to 49 in the chroma level compensator circuit 26 (see FIG. 5), respectively. The voltages thus held are added together in the adding circuit 55 as the difference signal against the reference voltage of the reference voltage source 54 regarding both of the channels of the black level and white level at every first or second channel, which then are supplied to the chroma gain control circuit 24 as the compensation signal S42. Thus, the amplitude of the pilot signals P1 and P2 is compensated to become the value corresponding to the reference voltage. Thus, the chroma signal C separated by the luminance/chroma separator circuit 31 (see FIG. 4) is compensated for. As a result, the depth of the colors on the picture screen can be made uniform on the whole.

Further, at the same time, the chroma signal C is compared with the reference subcarrier signal S31 by the phase comparator circuit 61 in the chroma phase compensator circuit 27 (see FIG. 5). And, the voltage corresponding to the phase difference therebetween is held in the holding circuits 63 to 66, respectively. The voltages thus held are added together in an adding circuit 71 as the difference signal against the reference voltage (in this case, the earth potential) regarding both the channels of the black level and white level at each first or second channel, and the added signal is then delivered to the adding circuit 18 in the speed error control circuit 14 (see FIG. 4) as the chroma phase compensation signal S29. Thus, the phase shift amount of the phase shifter circuit 20 in the speed error control circuit 14 is controlled in such a manner that the phase of the pilot signals P1 and P2 and accordingly the chroma signal may become the value corresponding to the reference voltage, and then the read clock signal S26 having the phase corresponding thereto is generated. Therefore, it is possible to prevent in advance a phenomenon in which the hue changes at each scanning line on the picture screen.

According to the video signal compensator circuit 1 as described above with reference to FIGS. 3 to 5, on the basis of the stable reference subcarrier signal S31, it is possible to read out from the sample data memory 5 the video output signal S33 which includes the chroma signal of the phase changing to follow the change of the phase of the burst signal contained in the first and second channel reproduced video signals. As a result, the amplitudes and the phases of the pilot signals P1 and P2 inserted into the horizontal blanking interval can be compensated for to become equal to the reference values determined by the chroma level compensator circuit 26 and the chroma phase compensator circuit 27. Accordingly, even when the distortion occurs in the amplitude and phase of the chroma signal upon expanding the timebase of the video signal just as in, for example, two-phase system, the compensation therefor can be made by compensating for the amplitude and phase of the pilot signal inserted into a part of the horizontal blanking interval.

While in the above the frequency of the pilot signal is selected to be the value same as that of the subcarrier of the chroma signal, if that frequency is selected to be a different value, the same effect as mentioned above can be achieved.

While in the above embodiment the pilot signal is inserted into the white level and black level positions, if the pilot signal is inserted into a desired position according to the necessity, the same effect as that of the above embodiment can be achieved.

As set forth above, according to the present invention, since the pilot signal is inserted into the positions of the white level and the black level in a part of the horizontal blanking interval, even if the frequency within the range of the frequency band of the video signal is assigned to the pilot signal, such pilot signal can be extracted surely. Accordingly, without expanding the frequency band range, the amplitudes and phases of the reproduced video signal or chroma signal can be compensated for to equal to the reference values and thus a picture having a good quality can be reproduced.

The above description is given on a single preferred embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. A method of processing a video signal having luminance and chrominance signals by using a plurality of rotary transducing heads and a recording tape which is moved longitudinally by a drive mechanism, comprising the steps of:
    expanding a time axis of said video signal by a factor of N to form a time axis expanded video signal;
    dividing said time axis expanded video signal into N video channels to form N divided, expanded video signals each having a horizontal blanking period; and
    inserting first and second pilot signals each having a predetermined frequency and DC voltage level alternately in a predetermined position in successive ones of said horizontal blanking periods, said first pilot signal having a DC voltage level near white peak level and said second pilot signal having a DC voltage level near black level.

2. A method according to claim 1, in which said video signal includes a color burst subcarrier signal and said predetermined frequency bears a predetermined relation to a frequency component of said color burst subcarrier signal.

3. An apparatus for processing a video signal having luminance and chrominance signals comprising:
    means for expanding a time axis of said video signal by a factor of N to form a time axis expanded video signal;
    means for dividing said time axis expanded video signal into N video channels to form N divided, expanded video signals each having a horizontal blanking period;
    means for producing first and second pilot signals each having a predetermined frequency and DC voltage level, said DC voltage level of said first pilot signal being different from said DC voltage level of said second pilot signal; and
    means for adding said first and second pilot signals alternately in successive ones of said horizontal blanking periods.

4. An apparatus according to claim 3, in which each of said divided, expanded video signals includes a color burst signal having a component of a given frequency and said predetermined frequency of said pilot signals is equal to said given frequency.

5. An apparatus for reproducing and processing a video signal having luminance and chrominance signals from a recording tape, said video signal being recorded by a process including a time axis expansion by a factor of N, division into N video channels to form N divided, expanded video signals each having a horizontal blanking period, and insertion of pilot signals, said pilot signals having first and second forms and being alternately inserted in a predetermined position of successive ones of said horizontal blanking periods, said first form of pilot signal having a DC voltage level different from said second form of pilot signal; said apparatus comprising:
    a plurality of transducing heads for generating N reproduced, divided, expanded video signals from said tape, said reproduced, divided, expanded video signals having a chroma level and a chroma phase and being subject to a time base error;
    means responsive to said reproduced, divided, expanded video signals for reducing said time base error;
    means for combining said N reproduced, divided, expanded video signals into one channel video signal having a chroma level and a chroma phase;
    means for reproducing said two pilot signals; and
    means responsive to said pilot signals for compensating said chroma level and said chroma phase of said one channel video signal in response to said reproduced pilot signals.

6. An apparatus for reproducing and processing a video signal having luminance and chrominance signals from a recording tape, said video signal being recorded by a process including a time axis expansion, division into a plurality of video channels to form a plurality of divided, expanded video signals each having a horizontal blanking period, and insertion of pilot signals, said pilot signals having at least two forms and being alternately inserted in a predetermined position of successive ones of said horizontal blanking periods, said two forms of pilot signals respectively having different DC voltage levels; said apparatus comprising:
    a plurality of transducing heads for generating a plurality of reproduced, divided, expanded video signals from said tape, said reproduced, divided, expanded video signals having a chroma level and a chroma phase and being subject to a time base error;
    means responsive to said reproduced, divided, expanded video signals for reducing said time base error;
    means for combining said plurality of reproduced, divided, expanded video signals into one channel video signal having a chroma level and a chroma phase;

means for reproducing said two pilot signals; and means responsive to said pilot signals for compensating said chroma level and said chroma phase of said one channel video signal in response to said reproduced pilot in which said chroma level compensating means comprises a detecting circuit for detecting levels of said reproduced pilot signals, a memory circuit responsive to said detecting circuit for memorizing levels of said reproduced pilot signals as detected by said detecting circuit, a comparing circuit responsive to said memory circuit for making comparisons of levels of said reproduced pilot signals as memorized by said memory circuit to a reference level and producing output signals which are based on said comparisons and indicative of level errors of said reproduced pilot signals, a circuit for mixing said output signals to produce a chroma gain compensation signal, and a chroma level controlling circuit controlled by said chroma gain compensation signal to compensate for said level errors.

7. An apparatus according to claim 6, in which said chroma phase compensating means comprises a phase comparator for determining phase errors between each of said reproduced pilot signals and a reference signal, a memory circuit responsive to said phase comparator for memorizing said phase errors, a level comparator responsive to said memory circuit for producing phase information output signals related to said phase errors, a phase information mixing circuit for mixing said phase information output signals to produce a chroma phase correcting signal, and a chroma phase controlling circuit controlled by said chroma phase correcting signal to compensate for said phase errors.

8. An apparatus according to claim 7, in which said two pilot signals respectively have different DC voltage levels.

9. An apparatus according to claim 8, in which one of said DC voltage levels is near white DC level and the other is near black DC level.

* * * * *